March 3, 1970   J. W. LUCAS   3,498,704
FILM SHEET FOR REPRODUCING MOTION PICTURES
Filed Oct. 22, 1965

INVENTOR.
JAMES W. LUCAS
BY Lyon & Lyon
ATTORNEYS 3,498,704
FILM SHEET FOR REPRODUCING MOTION PICTURES
James W. Lucas, 1480 N. Doheny Drive,
Los Angeles, Calif. 90069
Filed Oct. 22, 1965, Ser. No. 500,768
Int. Cl. G03b 31/02
U.S. Cl. 352—37                                          7 Claims

ABSTRACT OF THE DISCLOSURE

A motion picture film in the form of a flat sheet adapted to be wound around a cylinder in a projector for subsequent readout. The individual frames are offset from each other the width of a sound track, and a plurality of sound tracks extend perpendicular to the direction of offset of the frames, each sound track beginning adjacent its corresponding frame.

---

The present invention relates to the recording of motion pictures, including stereoscopic pairs, and of soundtracks on flat film sheets. The information thus stored is intended for readout on a device of the type described in my copending application, Ser. No. 500,751, filed Oct. 22, 1965.

Motion picture film of the conventional type has many disadvantages. Approximately one-third of the film area is taken up by pull-down sprocket holes. These holes are subject to a great amount of wear since the film must be stopped at each frame and then pulled rapidly to the next one. Constant winding and rewinding, and passage over two feed sprockets and through the film gate cause scratches in the picture area. Quantity reproduction of conventional film is expensive since each frame must be separately exposed. Magnetic soundtrack must be added to the film in a narrow strip the length of the film. 8 mm. sound is of poor quality due to the slow linear speed of the film. Because present film must be stored on a reel with a core and the reel kept in a can, storage volume requirements are high and special racks are required for accessibility. Additionally, if stereoscopic viewing is desired, the frame size must be cut in half, or two projectors used.

In the film of the present invention, all of the above listed objections are eliminated. No sprocket holes are used and wear is minimized since there is no relative motion between the film and any contacting surface. Viewing is done at constant speed with an octagon prism performing the shutter function. No rewinding is required, but merely a linear movement of the cylindrical film carriage. Quantity reproduction can be done at minimum cost, using normal contact-printing methods and exposing the entire film, including optical soundtracks, at one time. When magnetic recording is used, an area of reasonable rectangular dimensions replaces the long stripping normally required. High fidelity sound can be reproduced, because the sound readout speed is not necessarily related to the linear speed of the picture information. Indeed, the soundtrack can be played while still frames are being viewed. Storage space requirements are at an absolute minimum, with no reels required, and film stored flat in 8½" x 11" envelopes which fit standard filing cabinets. Full-frame stereoscopic pictures can be presented with one projector.

Many attempts have been made to reproduce motion pictures and record sound on a flat area. One example is seen in U.S. Patent No. 3,124,034, issued to R. S. Edhouse. A rigid assembly is made of a disc record and a film containing motion pictures printed in a spiral. A highly complex viewing device is required, with a travelling optical centerline and constantly varying rotational speed of the driven disc. U.S. Patent No. 3,117,491, issued to J. Stern, shows the use of a flat film wrapped around a cylinder for random access viewing. No provision is made for reproducing motion or sound, and the cylinder cannot be moved beyond one full rotation. In U.S. Patent No. 3,010,360, A. Renke, uses parallel rows of pictures on a flat sheet, arranged so that ends of adjacent rows can be aligned when the sheet is fastened to a cylinder. However, his sheet cannot be transparent, since a sound record is carried on the opposite side.

A principal object of my invention is to provide motion picture film which can be stored flat in a standard filing cabinet, eliminating the need for reels.

A further object is the provision of motion picture film which can be inexpensively reproduced in quantity.

An additional object is to provide a motion picture film which will allow the destructive effects of continued usage to be minimized.

A still further object is to allow motion picture film to have a maximum packing density of information.

Another object is to provide 8 mm. motion pictures with high fidelity sound capabilities.

Yet another object is the provision of a motion picture film which can be viewed stereoscopically.

An additional object is to provide a film which can record individual frames with their associated soundtracks, including divisible segments thereof.

The principles of operation of the viewing device should be explained before the many advantages and operating modes of my novel film can be understood.

A film is fastened around a transparent cylinder so that the upper and lower edges meet. One wall of the cylinder passes between a fixed light source and a fixed projection system, including an octagon prism. A sound readout head near the projection lens can be held stationary or rotated about the cylinder axis. Rotation of the octagon prism about its horizontal axis causes rotation and advancing of the cylinder in a helical path about its own horizontal axis. The pitch of this helix can be changed to accommodate the requirements of the film. Spring-loaded followers allow the helical path to be bypassed for immediate rewinding. The optical system is capable of combining horizontally adjacent stereoscopic pairs so that they can be viewed without the use of glasses.

It can now be seen that virtually no film abrasion results from moving the film by rotating the cylinder upon which it is fastened. It should also be clear that maximum packing density of information can be attained since no space must be reserved for sprocket holes. The octagon shutter permits constant rotational speed of the cylinder so that this same motion can be used for soundtrack readout. This type of shutter is not intermittent, but holds moving images momentarily stationary so that any single frame can be viewed with the same device by stopping at its approximate location.

With motion pictures, the soundtrack can be in one of three locations. For normal use, the track runs adjacent to the picture information, and for stereoscopic use it is adjacent to the pair of pictures. In both these cases, sound readout is accomplished by moving the film past a stationary readout head, at the same rate that the picture information is moving past the projection lens. Where high fidelity sound is desired, half the width of the film is devoted to the soundtrack, read out by a rotating sound head approximately four inches away from the projection lens. The sound head is rotated in a direction opposite to that of the cylinder so that the readout speed is the sum of the two motions. The area taken up by the soundtrack can be substantially different from half the film, in which case some longitudinal motion of the sound head is required during readout.

With still pictures, the soundtrack takes up approximately 95% of the total film area. The pictures are therefore interspersed with the soundtrack area and are viewed on a steep helical path. Thus, the advance from one frame to the next moves the cylinder longitudinally the width of one soundtrack. The sound head rotates in a plane perpendicular to the axis of the cylinder and makes one revolution for each picture. Switching circuitry in the viewing device allows selective readout of segments of each soundtrack. Several columns of pictures could also be used with the readout occurring during only a part of each revolution. Still pictures might also be arranged in several horizontal rows, either together or separated, with soundtracks read out vertically. This arrangement requires only longitudinal motion of the cylinder and lends itself better to the use of magnetic tape, but requires each row to be viewed separately from the beginning.

Flat film can be used on larger diameter or longer cylinders by hinging together several 8½" x 11" sections, allowing storage in standard file envelopes by folding the sections together along the hinge lines.

Referring now to the drawings.

Figure 1:
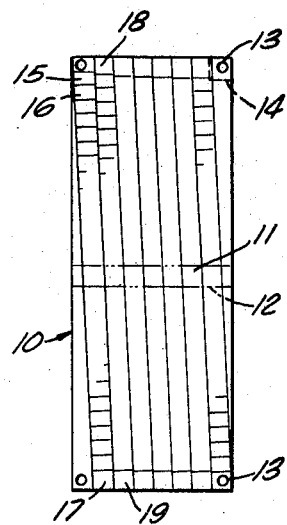
FIGURE 1 shows a multiple sectioned film of the present invention in the extended position. A silent motion picture sequence is shown.

As shown in FIGURE 1, the general configuration of flat film 10 is rectangular, and it may be provided with one or more lines 11 upon which it can be folded. These can be scored lines on the film or thin flexible connectors 12 joining two separate pieces of film. Four attaching holes 13 are located out of the picture area and may be reinforced by adding a layer 14. A succession of vertically adjacent picture frames 15 and 16 are printed in a straight column ending with frame 17. The adjacent column is parallel and carries pictures between frames 18 and 19. All rows are sloped in a manner that brings frame 17 directly above and aligned with frame 18 when wrapped around a cylinder with the attaching holes 13 located by the viewing device. Both sides of film 10 could be cut parallel to the picture columns if another method of attachment to the cylinder were used.

Figure 2:
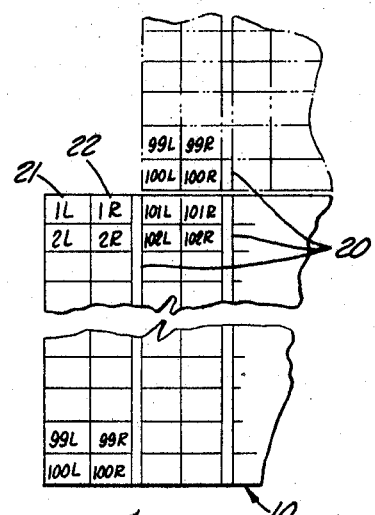
FIGURE 2 is a view showing how the film ends align when wrapped around the viewer cylinder. A stereoscopic sound motion sequence is shown here.

FIGURE 2 shows the cooperation between the ends of film 10 when a soundtrack 20 is used. Stereoscopic pairs 21 and 22 are also shown. Direction of motion of the film for viewing is upward. In this configuration, as well as with two-dimensional pictures with sound, the picture columns move past the projection lens of the viewer at the same speed as soundtracks 20 go by the stationary readout head.

Figure 3:
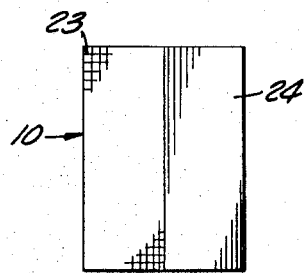
FIGURE 3 illustrates the arrangement used for high fidelity sound motion pictures.

In FIGURE 3, an enlarged rectangular sound recording area 24 takes up one-half the area of film 10. Picture information, with successive frames in vertical columns as shown in FIGURE 1, fills area 23. In this arrangement, the readout head moves down at a fast rate, while the film moves up past the projection lens at a slower rate. The actual readout speed is then the combination of both rates, giving high fidelity capabilities to sound area 24, while maintaining slow linear speed of picture area 23.

Figure 4:
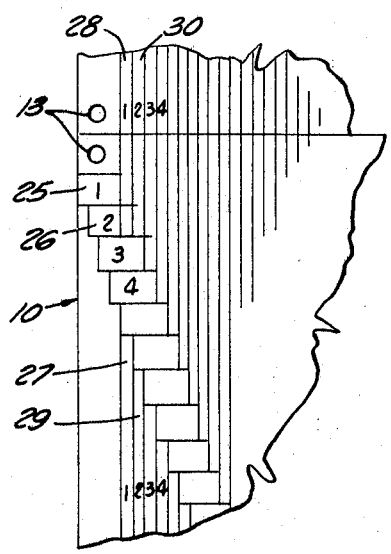
FIGURE 4 shows the preferred embodiment for single frames with associated soundtracks.

The preferred method of combining still pictures with their associated soundtracks is indicated in FIGURE 4. Frame 26 is offset from preceding frame 25 by the width of the soundtrack associated with frame 25. This track begins at 27 and ends at 28. The offset between frames matches the longitudinal motion imparted to the viewer cylinder by rotating it to move film 10 vertically from frame 25 to succeeding frame 26. This same motion places soundtrack 29–30 in the position previously occupied by soundtrack 27–28. The sound readout head moves down relative to the stationary film.

If shorter soundtracks are acceptable for some uses, the picture pattern may be repeated (with different information) several times within the length of film 10. This requires a multiple track on the viewer helix.

Figure 5:
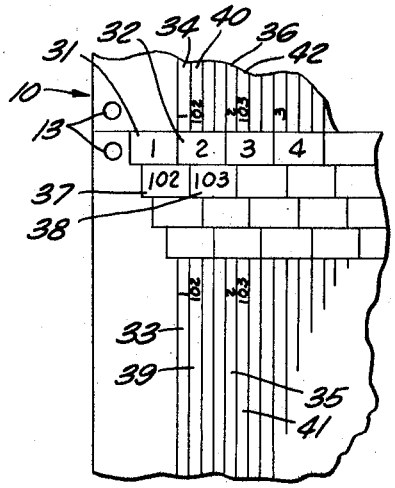
FIGURE 5 is a view of an alternate arrangement for single frames with their associated soundtracks.

FIGURE 5 shows an alternate arrangement of still pictures with their associated soundtracks. Successive frames 31 and 32 are in horizontal rows with the soundtracks for frame 31 starting at 33 and ending at 34. The soundtrack for frame 32 starts at 35 and ends at 36. Horizontal motion of the viewer cylinder moves frame 32 into the position previously occupied by frame 31 and soundtrack 35–36 then succeeds track 33–34. When the first row of pictures has been viewed, the viewer cylinder is returned to its starting location and rotated to move frame 37 into viewing position. Its associated soundtrack starts at 39 and ends at 40. Further horizontal motion of the viewer cylinder brings succeeding frame 38 into viewing position, along with its particular soundtrack, which starts at 41 and ends at 42.

Again, the sound readout head moves downward relative to the film. Also, more picture rows may be used by repeating this arrangement several times within the length of film 10. Shorter soundtracks will result, however.

As a typical example of the preparation and use of my novel film, two-dimensional 8 mm. motion pictures with optical soundtrack will be selected. A viewer cylinder of 10½ inches outside diameter is available, requiring a film of 8½ inch width and 33 inch length. Three pieces of 8½" x 11" film are joined with thin transparent tape so that they will fold to store in a standard file drawer.

Picture flicker presents no problem, since the octagon prism shutter used in the viewer never cuts off the light beam. Therefore a slower-than-normal frame rate of 12 frames per second can be used. A film using this frame rate will reproduce approximately 8 minutes of motion pictures with the soundtrack being read out at a speed of 1⅞ inches per second.

A master negative can be made directly from the camera strip-film either by a step-and-repeat projector or by a double pulldown optical printer. In this way, alternate frames of normal 24 frame per second motion pictures are recorded consecutively. The optical soundtrack is reduced to half its normal length by projection and is continuously printed with the film wrapped around a 10½ inch diameter cylinder, and rotated on a lead-screw with a pitch of ¼ inch per revolution. Once the master negative has been made, duplicate films can be produced by simple contact-printing methods.

An example of the arrangement illustrated in FIGURE 3 allows 5 minutes of 8 mm. motion pictures to be printed in adjacent columns at a display rate of 12 frames per second. One-half the area of the film remains, so a rectangular piece of magnetic tape material 4¼" x 33" is cemented onto the film in this area. The picture information is recorded by the method just described. The soundtrack, if pre-recording is desired, is rotated on the 10½ inch diameter cylinder with a lead-screw pitch of 1/16 inch per revolution. A speed of 7½ inches per second is used on the soundtrack only. During playback of this film, the picture information moves at a rate of 1⅞ inches per second, with the remainder of the readout speed resulting from rotation of the sound head at 5⅝ inches per second in the opposite direction. The tape, of course, can be supplied blank and recorded while the picture information is being viewed.

Typical usage of the novel film shown in FIGURE 4 allows the recording of 150 frames of 8 mm. format, each with its own associated soundtrack of 16 seconds duration at 1⅞ inches per second. By repeating the arrangement at 180° intervals, 300 frames can have soundtracks of 8 seconds each. The frames can be selectively printed by step-and-repeat methods, then masked while optical soundtracks are printed one line at a time. The film is wrapped around a 10½ inch diameter cylinder, rotated without advancing during the printing of each soundtrack, and then moved axially .050 inch to the next soundtrack location. If magnetic recording is desired, an 8½" x 33" piece of tape is cemented onto the printed film. The tape has areas cut out where picture information exists, or several strips of tape can be cemented between rows of pictures. The same method applies to the configuration shown in FIGURE 5.

It will be readily apparent to those skilled in the art that the specific embodiments of the present invention which have been previously described may be modified considerably without departing from the spirit of the invention. For example, the continuous helical relationship of the picture columns could be replaced by the requirement of a picture-width jump at the end of each vertical column to get to the next adjacent column. The provisions for end attachment of the film can take many forms such as lots, interlocking feet, folds, etc. Hinge lines within the film area can run vertically. Indeed, successive pictures can be horizontally adjacent, or rotated 90° from the positions shown. Motion sequences can run from the bottom up instead of from the top down, and can be intermixed with still frames in any combination. Adjacent stereoscopic pairs may be used in the arrangements shown in FIGURES 3, 4 and 5, or can be replaced by question and answer frame pairs. Although 8 mm. format pictures have been indicated in the examples given, the size of pictures usable with my novel film is limited only by the curvature of the cylinder used in the viewer, and by the resolution capabilities of the optical system.

Having fully described the present invention, it is to be understood that it is not to be limited to the specific details set forth, but is of the full scope of the appended claims.

I claim:
1. Flat film bearing pictorial and auditory information, wherein said information is arranged in a series of straight parallel rows, each said row of pictorial information being offset from another said row by the width of one of said rows of auditory information, and said auditory rows being perpendicular to said pictorial rows.

2. The film of claim 1, wherein each row of pictorial information comprises a series of stereoscopic pairs.

3. The film of claim 1, wherein each row of pictorial information comprises a series of individual frames.

4. The film of claim 3 wherein each individual frame is associated with one of said rows of auditory information.

5. Flat film bearing pictorial and auditory information, wherein said pictorial information comprises a series of individual frames and said auditory information is arranged in a series of straight parallel tracks, each of said pictorial frames being offset in one direction from another of said frames by the width of one of said auditory tracks, each of said auditory tracks being perpendicular to the direction of offset of said pictorial frames and beginning and ending adjacent a said pictorial frame.

6. The film in claim 5, wherein both ends of each of said auditory tracks can be brought into alignment by forming said film into a cylindrical shape.

7. The film in claim 5, wherein each individual frame is associated with one of said auditory tracks.

References Cited

UNITED STATES PATENTS

| | | | |
|---|---|---|---|
| 3,355,292 | 11/1967 | White | 352—239 |
| 1,271,247 | 7/1918 | Wade | 352—232 |
| 2,136,209 | 11/1938 | Finch | 353—15 |
| 2,590,956 | 4/1952 | Gille. | |
| 1,231,958 | 7/1917 | Snow et al. | 352—101 |
| 2,694,436 | 11/1954 | Pettit | 156—502 |
| 3,341,276 | 9/1967 | Prater | 352—101 |

FOREIGN PATENTS

| | | |
|---|---|---|
| 568,441 | 4/1945 | Great Britain. |
| 292,711 | 6/1928 | Great Britain. |

NORTON ANSHER, Primary Examiner

M. H. HAYES, Assistant Examiner

U.S. Cl. X.R.

352—101, 239; 353—19